(12) United States Patent
Ishikawa et al.

(10) Patent No.: US 6,935,529 B2
(45) Date of Patent: Aug. 30, 2005

(54) STAINLESS STEEL FUEL TANK FOR AUTOMOBILE

(75) Inventors: Hanji Ishikawa, Amagasaki (JP);
Shigeru Morikawa, Amagasaki (JP);
Toshirou Nagoya, Shin-Nanyo (JP);
Toshiro Adachi, Shin-Nanyo (JP);
Naoto Hiramatsu, Shin-Nanyo (JP);
Satoshi Suzuki, Shin-Nanyo (JP)

(73) Assignee: Nisshin Steel Co., Ltd., Tokyo (JP)

( * ) Notice: Subject to any disclaimer, the term of this patent is extended or adjusted under 35 U.S.C. 154(b) by 135 days.

(21) Appl. No.: 10/343,402

(22) PCT Filed: Jul. 26, 2001

(86) PCT No.: PCT/JP01/06424

§ 371 (c)(1),
(2), (4) Date: Sep. 26, 2003

(87) PCT Pub. No.: WO02/09964

PCT Pub. Date: Feb. 7, 2002

(65) Prior Publication Data

US 2004/0076776 A1 Apr. 22, 2004

(30) Foreign Application Priority Data

Aug. 1, 2000 (JP) .................................. 2000-233416

(51) Int. Cl.[7] .................. B60K 15/03; B32B 15/04; B32B 15/18; C22C 38/00; C22C 38/40
(52) U.S. Cl. .................. 220/562; 220/4.14; 428/685
(58) Field of Search .................. 220/562, 4.14; 428/685

(56) References Cited

U.S. PATENT DOCUMENTS

| | | | | |
|---|---|---|---|---|
| 4,933,143 A | * | 6/1990 | Adachi et al. ............... 420/49 |
| 4,999,159 A | * | 3/1991 | Uematsu et al. ............. 420/53 |
| 5,286,442 A | * | 2/1994 | Uematsu et al. ............. 420/40 |
| 5,302,214 A | * | 4/1994 | Uematsu et al. ............. 148/325 |
| 5,462,611 A | * | 10/1995 | Uematsu et al. ............. 148/325 |
| 5,496,514 A | * | 3/1996 | Yamauchi et al. ............ 420/34 |
| 5,591,391 A | * | 1/1997 | Igarashi et al. .............. 420/38 |
| 5,709,836 A | * | 1/1998 | Fujisawa et al. ............. 420/41 |
| 5,942,184 A | * | 8/1999 | Azuma et al. ................ 420/67 |
| 5,985,048 A | * | 11/1999 | Wahlert et al. .............. 148/272 |
| 6,231,690 B1 | * | 5/2001 | Azuma ....................... 148/287 |
| 6,440,236 B1 | * | 8/2002 | Hiramatsu et al. ........... 148/608 |
| 6,645,318 B2 | * | 11/2003 | Takahashi et al. ............ 148/325 |
| 2002/0015655 A1 | * | 2/2002 | Suzuki et al. ................ 420/46 |
| 2002/0102178 A1 | * | 8/2002 | Hiramatsu et al. ........... 420/46 |
| 2002/0127131 A1 | * | 9/2002 | Katsuki et al. ............... 420/34 |
| 2003/0099567 A1 | * | 5/2003 | Suzuki et al. ................ 420/80 |
| 2003/0183626 A1 | * | 10/2003 | Tomimura et al. ........... 220/4.14 |

FOREIGN PATENT DOCUMENTS

| | | |
|---|---|---|
| EP | 0 750 052 A1 | 12/1996 |
| JP | 01-159321 A | 6/1989 |
| JP | 09-263904 A | 10/1997 |
| JP | 10-130786 A | 5/1998 |
| JP | 2000-001758 A | 1/2000 |
| JP | 2000-144344 A | 5/2000 |

* cited by examiner

*Primary Examiner*—Deborah Jones
*Assistant Examiner*—Jason L Savage
(74) *Attorney, Agent, or Firm*—Webb Ziesenheim Logsdon Orkin & Hanson, P.C.

(57) ABSTRACT

A fuel tank for a motor vehicle is fabricated from an austenitic stainless steel sheet having elongation of 50% or more after fracture by a uniaxial stretching test with a work-hardening coefficient of 4000 N/mm$^2$ or a ferritic stainless steel sheet having elongation of 30% or more after fracture with Lankford value of 1.3 or more. The stainless steel sheets are reformed to a complicated shape of a fuel tank without work flaws such as cracks or break-down. Excellent corrosion-resistance of stainless steel itself is maintained in the fabricated fuel tank. Consequently, the proposed fuel tank is used without diffusion of gasoline to the open air over a long term.

2 Claims, 1 Drawing Sheet

STAINLESS STEEL FUEL TANK FOR AUTOMOBILE

TECHNICAL FIELD

The present invention relates to a fuel tank made of stainless steel for a motor vehicle good of airtightness so as to inhibit diffusion of a stored fuel for a long term.

BACKGROUND

A fuel tank for a motor vehicle such as an automobile or motorcycle is commonly used for storage of gasoline. If the airtightness of the fuel tank is poor, gasoline, which has been vaporized in the tank, diffuses to the open air. Diffusion of gasoline is one of the causes which adversely affects the global environment, which is especially valued recently. For instance, a conventional fuel tank made of synthetic resin does not assure sufficient hermetic structure against diffusion of vaporized gasoline. Another type of a fuel tank is also known, which is made of a surface-finished steel sheet such as a Zn or Al-coated steel sheet. However, the coating layer is often peeled off or cracked during reforming of the surface-finished steel sheet to a product shape. Such defects as cracks or flaking act as starting points for corroding reaction, when the fuel tank is exposed to a corrosive atmosphere containing organic acids generated by degradation of gasoline. Pitting corrosion causes formation of holes opened through a wall of the fuel tank, and significantly worsens hermetic structure of the fuel tank.

Applicability of stainless steel, as representative corrosion-resistant material, has been researched and examined for fabrication of a fuel tank in order to maintain hermetic structure over a long term. But, formability of stainless steel is poor compared with cold reduced carbon steel, so that work-induced cracks often occur when it is shaped to a fuel tank by a complicated process accompanied with deep-drawing and bulging. Therefore, it is difficult to manufacture fuel tanks from stainless steel sheets by an economic and stable pressing process. Even when a stainless steel sheet is press-formed to a desired shape, a fuel tank is not of a sufficient hermetic structure to inhibit diffusion of vaporized gasoline, due to the presence of microcracks. Moreover, work-induced defects act as starting points for corroding reaction, and causes growth of pitting to an extent passing through a wall especially at an inner surface of a fuel tank exposed to depleted gasoline.

However, stainless steel, which is bestowed with formability necessary for fabrication of a fuel tank and also good of corrosion resistance, has not been proposed so far.

SUMMARY OF THE INVENTION

The present invention aims at provision of a fuel tank, which can maintain an excellent hermetic structure over a long term without diffusion of a stored fuel to an outside, by using a stainless steel sheet which has a specified composition and a Cr-rich passive film generated on its surface.

The present invention proposes a fuel tank made of an austenitic stainless steel sheet which exhibits elongation of 50% after fracture or more by a uniaxial stretching test with a work-hardening rate not more than 4000 N/mm$^2$, or a ferritic stainless steel sheet which exhibits elongation of 30% or more after fracture by a uniaxial stretching test with Lankford value (a value r) not less than 1.3.

The austenitic stainless steel has basic composition of 15–20 mass % Cr, 5–19 mass % Ni, 0–5 mass % Cu, preferably not more than 0.005 mass % of S, optionally not more than 0.10 mass % of C+N, optionally Si up to 2.0 mass %, optionally Mn up to 5.0 mass % and the balance being Fe except inevitable impurities. The austenitic stainless steel may further contain one or more of Mo up to 3.0 mass %, Al up to 0.5 mass %, Ti up to 1.0 mass %, Nb up to 1.0 mass %, Zr up to 1.0 mass %, V up to 1.0 mass %, B up to 0.1 mass %, rare earth metals (REM) up to 0.05 mass % and Ca up to 0.03 mass %.

The ferritic stainless steel has the basic composition of 11–20 mass % Cr, preferably not more than 0.01 mass % of S, optionally not more than 0.10 mass % of C+N, optionally not more than 1.0 mass % of Si, optionally not more than 1.0 mass % of Mn and the balance being Fe except inevitable impurities. The ferritic stainless steel may further contain one or more of Mo up to 3.0 mass %, Al up to 0.5 mass %, Ti up to 1.0 mass %, Nb up to 1.0 mass %, Zr up to 1.0 mass %, V up to 1.0 mass %, B up to 0.1 mass %, REM up to 0.05 mass % and Ca up to 0.03 mass %.

Either the austenitic or ferritic stainless steel sheet is good of corrosion-resistance in a state coated with a Cr-rich passive film whose Cr and Fe concentrations are controlled not less than 25 atomic % and not more than 75 atomic %, respectively. Due to the excellent corrosion-resistance, a fuel tank made of the stainless steel is prevented from pitting even in a state exposed to a corrosive atmosphere containing depleted gasoline.

PREFERRED EMBODIMENTS OF THE INVENTION

Figure 1:
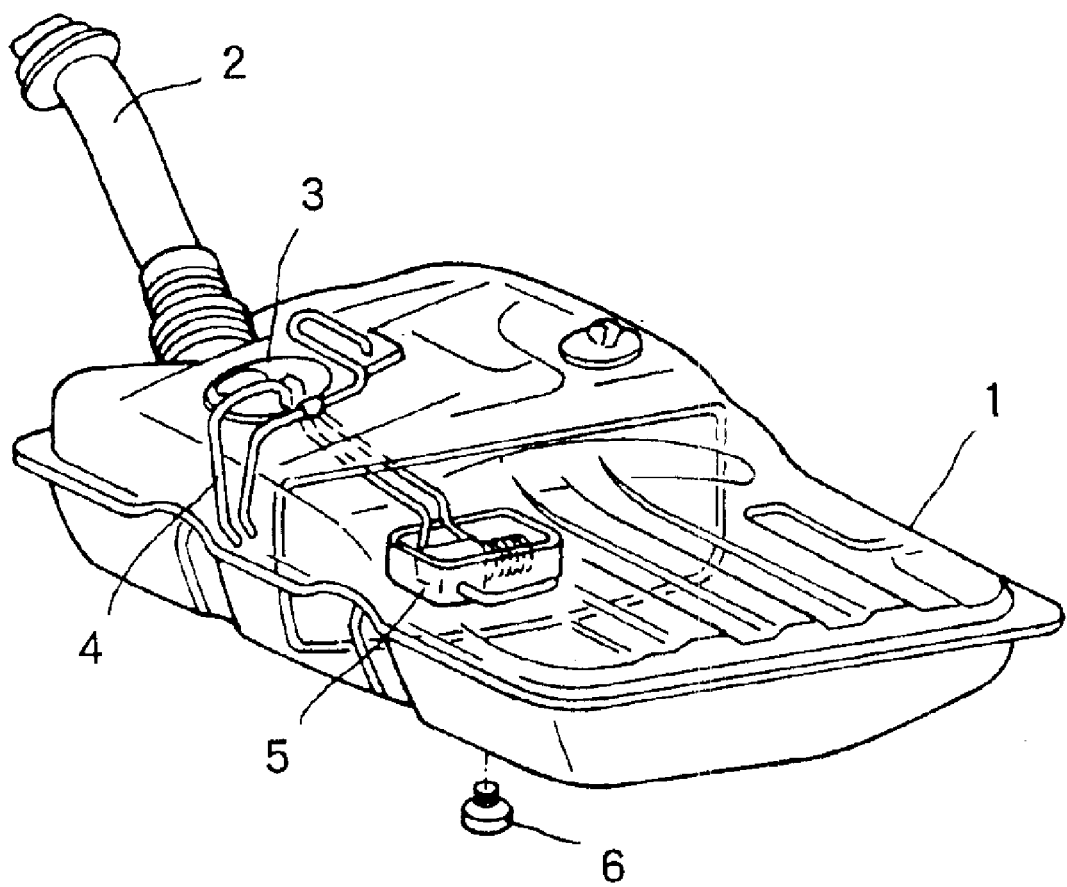
FIG. 1 is a schematic view illustrating a fuel tank.

A fuel tank is manufactured by press-forming steel sheets to upper and lower parts with complicated shapes and seam-welding the halves together, as shown in FIG. 1. Various members, e.g. an inlet tube 2, a fuel tube 3, a fuel return tube 4, a sub-tank 5 and a drain plug 6, are fixed to a body of the fuel tank 1 by welding, brazing or the like. Steel sheets are press-formed to shapes of upper and lower halves by complicated process accompanied with drawing and bulging. Due to the complicated press-forming, a stainless steel sheet poor of formability is often cracked at heavily-worked parts.

For instance, an austenitic stainless steel is more work-hardened than cold reduced carbon steel, due to martensitic transformation of its matrix induced by plastic deformation. In this regard, the inventors have researched properties of stainless steel, which can be press-formed to a product shape without defects, using a work-hardening coefficient as an index representing hardening caused by generation of strain-induced martensite. As a result, the inventors have discovered that an austenitic stainless steel, which exhibits elongation of 50% after fracture or more by a uniaxial stretching test with a work-hardening rate not more than 4000 N/mm$^2$, can be press-formed to a product shape without defects such as cracks.

For measurement of elongation after fracture and a work-hardening coefficient, each stainless steel sheet is sampled along a direction-crossing a rolling direction and shaped to a test piece #13B regulated by JIS Z2201. A value, which is obtained by stretching the test piece at a rate of 20 mm/minute, butting ruptured parts together and measuring an elongated ratio of a distance between marked points, is regarded as elongation after fracture. A work-hardening coefficient is evaluated as a gradient of a stress between two points when a tensile strain of 30% or 40% is applied to the test piece.

Since ferritic stainless steel is harder and less expansible than cold reduced carbon steel due to higher Cr content, improvement of formability, which is caused by bulging or the similar plastic deformation originated in ductility of the material, is not expected. In this regard, Lankford value (a value r) is used as an index representing reduction of thickness and metal flow along a widthwise direction, for researching properties of a stainless steel sheet which can be press-worked to a product shape. As a result, the inventors have discovered that a ferritic stainless steel sheet, which exhibits elongation of 30% or more after fracture with Lankford value (a value r) not less than 1.3, can be press-formed to a predetermined shape without defects such as cracks.

Elongation after fracture is measured by the same way as for an austenitic stainless steel sheet. Each steel sheet is sampled along a direction crossing a rolling direction and shaped to a test piece #13B regulated by JIS Z2201 for measurement of Lankford value (a value r). Thickness and width of the test piece are measured after application of a strain of 15%, and Lankford value (a value r) is calculated as a quotient obtained by dividing a natural logarithm value of width reduction rate by a natural logarithm value of thickness reduction rate.

Furthermore, a stainless steel sheet is bestowed with excellent corrosion resistance in a corrosive atmosphere containing depleted gasoline converting a spontaneous passive film on a surface of the stainless steel sheet to a Cr-enriched state. When a fuel tank is left alone as such in a state storing gasoline therein over a long term in a high-temperature humidified atmosphere, the atmosphere turns to a corrosive atmosphere containing organic acids due to degeneration of gasoline. The corrosive atmosphere is offensive even to stainless steel. The inventors have researched the mechanism of corroding reaction under such condition, and noted occurrence and propagation of corrosion at parts of a passive film containing Fe at a relatively high ratio. Taking into account the effects of Fe content on corrosion, the inventors hit upon conversion of the passive film to a Cr-enriched state. In actuality, such conversion effectively inhibits corrosion of the stainless steel sheet.

The effect of Cr content in the passive film on corrosion prevention may be explained as follows: Occurrence of defects caused by dissolution of metallic element from the passive film is reduced as increase of Cr content, since a dissolution speed of Cr is fairly slower than Fe in an acidic atmosphere. Conversion of the passive film to the Cr-enriched state can be realized by heat-treatment in a reducing atmosphere such as hydrogen or by pickling a steel sheet with hydrofluoric or nitric acid after annealing in an open-air atmosphere. The effect of the converted passive film on corrosion prevention is typically noted by enriching Cr content more than 25 atomic % and reducing Fe content less than 75 atomic %.

Stainless steel useful as a body of a fuel tank preferably has composition as follows:

(C+N)

C and N are elements which solution-harden steel, resulting in increase of 0.2%-yield strength and hardness. Especially, austenitic stainless steel is greatly work-hardened due to generation of very hard strain-induced martensite. Increase of hardness means degradation of formability and impedes metal flow from a flanged edge during deep drawing. Consequently, a stainless steel sheet can not be press-formed to a product shape, but big wrinkles occur at the flanged edge which is clamped during deep-drawing. The wrinkled edge makes it difficult to prepare a flat plane necessary for welding, resulting in degradation of productivity. Excess C content in an austenitic stainless steel unfavorably promotes delayed fracture (so-called as "season cracking") at parts heavily deformed during deep-drawing, while excess C content in a ferritic stainless steel accelerates precipitation of carbides harmful on corrosion resistance in a steel matrix. In this sense, a total ratio of C+N is determined at a value not more than 0.10 mass %.

Si

Si is an alloying element added as a deoxidizing agent on a steel-making stage. But, excess Si more than 2.0 mass % as for austenitic stainless steel or more than 1.0 mass % as for ferritic stainless steel hardens a steel sheet, accelerates work-hardening and worsens formability.

Mn

Transformation of austenite to a strain-induced martensite is more suppressed as increase of Mn content in an austenitic stainless steel sheet. A work-hardening ratio of the steel sheet is reduced due to suppression of the strain-induced transformation. However, excess Mn causes damage of refractory for a steel-making furnace and also increase of Mn-containing inclusions which will act as starting points for occurrence of cracking. These defects are eliminated by controlling Mn content not more than 5.0 mass %. A ferritic stainless steel sheet is also harder as increase of Mn content. In this sense, Mn content shall be adjusted to a possible lowest level. But, control of Mn content at an extremely lower level uneconomically raises a steel-making cost. Therefore, an upper limit of Mn content is determined at a ratio of 1.0 mass %, which can be attained by cost minimum.

S

Sulfides such as MnS, which act as starting points for corrosion, are more distributed in a steel matrix as increase of S content. Increase of S content also promotes occurrence of cracks in a steel sheet, which is heavily deformed to a shape of a fuel tank. Since a naturally mixing rate of S as a ferrite former is different between ferritic and austenitic stainless steels, S content is preferably controlled at a ratio not more than 0.005 mass % as for the austenitic stainless steel or at a ratio not more than 0.01 mass % as for the ferritic stainless steel.

Ni

Ni is an essential element for austenitic stainless steel, and Ni content of 5% at least is necessary to maintain an austenitic phase. Increase of Ni content suppresses work-hardening originated in generation of strain-induced martensite, resulting in decrease of a work-hardening ratio. However, Ni is an expensive alloying element, and an austenitic stainless steel sheet can be press-formed to a product shape without increase of Ni content above 19 mass %. In this sense, an upper limit of Ni content in the austenitic stainless steel is determined at 19.0 mass %. On the other hand, excess Ni in a ferritic stainless steel causes generation of a martensitic phase in an annealing step of a conventional manufacturing process and worsens corrosion-resistance of an obtained steel sheet. In this regard, an upper limit of Ni content in ferritic stainless steel is determined at 0.60 mass % in order to realize a homogeneous ferritic structure under stable conditions.

Cr

Cr is an element effective for corrosion resistance, and its effect is noted at a ratio not less than 15 mass % as for austenitic stainless steel or at a -ratio not less than 11 mass % as for ferritic stainless steel. However, austenitic and ferritic stainless steels become harder as increase of Cr content, resulting in degradation of formability. In this regard, an upper limit of Cr content is determined at 20 mass %.

Cu

Cu is an important element for improvement of formability, since it effectively suppresses work-hardening caused by generation of strain-induced martensite. Especially, addition of Cu at a ratio more than 2.0 mass % enlarges freedom of Ni addition and enables decrease of expensive Ni content down to 5 mass % or so.

Cu is also effective for resistance to stress corrosion cracking. Its effect is typically noted at a ratio of 2.0 mass % or more. However, excess Cu worsens hot-workability of austenitic stainless steel, so an upper limit of Cu content is determined at 5.0 mass %. On the other hand, Cu content in ferritic stainless steel is preferably at an industrially controllable minimum level, e.g., 0.50 mass % at most, since ferritic stainless steel becomes harder as the Cu content increases.

Mo

Mo is an optional element for improvement of corrosion-resistance, but its upper limit is determined at 3.0 mass % in order to avoid increase of hardness.

Al

Al is an optional element added as a deoxidizing agent. When Al is added to steel melt just before addition of Ti, Zr and B, these elements are efficiently included at predetermined levels due to decrease of oxygen concentration in the steel melt. However, excess Al extremely raises hardness of steel and generates hard inclusions harmful on formability. In this regard, an upper limit of Al content is preferably determined at 0.5 mass %.

Ti, Nb, Zr, V

Ti, Nb, Zr and V are optional elements for fixing solution-hardening elements, reducing hardness of steel and improving formability. Effects of these elements are saturated at 1.0 mass %.

B

B is an optional element for improving hot-workability and inhibiting cracks during hot-rolling. However, excess B above 0.1 mass % worsens hot-workability on the contrary.

REM (rare earth metals)

REM is an optional element for improvement of hot-workability, but excess REM above 0.05 mass % raises hardness of steel and worsens formability.

Ca

Ca is also an optional element added as a deoxidizing agent in a steel making process. Ca is also effective for hot-workability. But, the effects of Ca are saturated at 0.03 mass %, and excess Ca is harmful on cleanliness of steel.

The other features of the present invention will be apparent from the following examples.

Several stainless steels shown in Table 1 were processed to steel strips of 0.8 mm in thickness. Each strip was sampled and reformed to a shape of a fuel tank shown in FIG. 1. An inlet tube 2, a fuel tube 3, a fuel-return tube 4, a sub-tank 5 and a drain plug 6 were individually welded or soldered to the fuel tank, each joint was hermetically sealed, and the fuel tank was filled with 50 liters gasoline.

TABLE 1

Chemical Composition Of Stainless Steels

| Steel Kind | Alloying Elements (mass %) | | | | | | | | | | |
|---|---|---|---|---|---|---|---|---|---|---|---|
| | C | Si | Mn | Ni | Cr | S | Cu | N | Mo | Others | C + N |
| 1 | 0.010 | 0.30 | 1.70 | 8.00 | 17.00 | 0.001 | 3.20 | 0.010 | 0.02 | — | 0.02 |
| 2 | 0.060 | 0.55 | 0.80 | 8.10 | 18.25 | 0.003 | 0.20 | 0.030 | 0.10 | — | 0.09 |
| 3 | 0.050 | 0.60 | 1.00 | 10.10 | 17.00 | 0.002 | 0.30 | 0.030 | 2.10 | — | 0.08 |
| 4 | 0.015 | 0.60 | 1.10 | 10.00 | 18.50 | 0.002 | 0.20 | 0.030 | 0.05 | — | 0.05 |
| 5 | 0.020 | 1.50 | 2.00 | 7.10 | 16.20 | 0.003 | 2.00 | 0.015 | 0.14 | — | 0.04 |
| 6 | 0.041 | 0.71 | 1.09 | 8.23 | 18.41 | 0.004 | 0.31 | 0.042 | 0.22 | Al:0.08 | 0.08 |
| 7 | 0.048 | 0.61 | 0.97 | 10.21 | 16.98 | 0.003 | 0.32 | 0.012 | 0.18 | Ti:0.28 | 0.06 |
| 8 | 0.012 | 0.45 | 1.21 | 9.99 | 18.98 | 0.001 | 0.41 | 0.022 | 0.51 | Nb:0.21 | 0.03 |
| 9 | 0.011 | 0.28 | 1.64 | 7.98 | 17.21 | 0.002 | 3.18 | 0.018 | 0.18 | Zr:0.33 | 0.03 |
| 10 | 0.018 | 1.44 | 1.88 | 7.21 | 16.44 | 0.002 | 2.21 | 0.021 | 0.22 | V:0.11 | 0.04 |
| 11 | 0.055 | 0.43 | 0.75 | 8.33 | 18.43 | 0.003 | 0.81 | 0.032 | 0.31 | REM:0.03 | 0.09 |
| 12 | 0.011 | 0.28 | 1.58 | 8.01 | 17.09 | 0.003 | 3.09 | 0.018 | 0.28 | B:0.05 | 0.03 |
| 13 | 0.041 | 0.29 | 0.34 | 0.23 | 11.20 | 0.004 | 0.22 | 0.021 | 0.24 | — | 0.06 |
| 14 | 0.061 | 0.38 | 0.77 | 0.18 | 12.52 | 0.009 | 0.31 | 0.022 | 0.31 | — | 0.08 |
| 15 | 0.070 | 0.54 | 0.22 | 0.15 | 16.41 | 0.008 | 0.24 | 0.019 | 0.19 | — | 0.09 |
| 16 | 0.018 | 0.17 | 0.31 | 0.12 | 17.98 | 0.003 | 0.18 | 0.013 | 1.01 | Ti:0.32 | 0.03 |
| 17 | 0.021 | 0.40 | 0.32 | 0.21 | 17.02 | 0.005 | 0.28 | 0.011 | 0.14 | Nb:0.41 | 0.03 |
| 18 | 0.023 | 0.31 | 0.41 | 0.19 | 16.60 | 0.008 | 0.31 | 0.022 | 0.42 | Ti:0.81 | 0.05 |

A whole of the fuel tank was located in an airtight container held in a constant atmosphere of 25° C. and 60% RH. After the fuel tank is left as such in the container over all day long, hydrocarbon concentration in the container was measured. A fuel tank, from which diffusion of hydrocarbon was not detected (i.e. less than detection limit of 0.1 g), was evaluated as hermetic structure (○). A fuel tank, from which diffusion of hydrocarbon was detected, was evaluated as poor hermetic structure (X). For comparison, fuel tanks made from synthetic resin and Zn-coated steel sheet were also examined by the same test.

Furthermore, another fuel tank made from each steel sheet was installed in a motor vehicle, and the motor vehicle was practically driven for 150,000 miles (about 240,000 km) running test. Thereafter, the fuel tank was detached from the motor vehicle, filled with 50 liters gasoline, and examined by the same hydrocarbon diffusion test as for the just-fabricated fuel tank.

Results shown in Table 2 prove that any fuel tank according to the present invention kept good hermetic structure without diffusion of hydrocarbon in a just-fabricated state and even after 150,000 miles running test. Diffusion of hydrocarbon was not detected at any of the reformed parts, welded joints and soldered joints, and each part was not deteriorated by corrosion even after 150,000 miles running test. That is, diffusion of gasoline does not occur over a long term.

On the other hand, diffusion of hydrocarbon from a fuel tank made of synthetic resin was detected in a just-fabricated state, and a big volume of hydrocarbon diffused after 150,000 miles running test. In case of a fuel tank made from a Zn-coated steel sheet, diffusion of hydrocarbon was not detected in a just-fabricated state, but its hermetic structure was not kept over a long term. In actual, diffusion of hydrocarbon was detected after 150,000 miles running test.

TABLE 2

Physical Properties And Hermetic Structure Of Fuel Tank

| Steel No. or kind of material | Physical Properties (1) (%) | (2) (N/mm²) | Value r | Diffusion of Hydrocarbon (3) | (4) | Note |
|---|---|---|---|---|---|---|
| 1 | 62 | 3098 | — | ○ | ○ | Inventive Examples |
| 2 | 61 | 3765 | — | ○ | ○ | |
| 3 | 57 | 3564 | — | ○ | ○ | |
| 4 | 59 | 3212 | — | ○ | ○ | |
| 5 | 62 | 3341 | — | ○ | ○ | |
| 6 | 61 | 3822 | — | ○ | ○ | |
| 7 | 58 | 3677 | — | ○ | ○ | |
| 8 | 60 | 3433 | — | ○ | ○ | |
| 9 | 63 | 3054 | — | ○ | ○ | |
| 10 | 62 | 3412 | — | ○ | ○ | |
| 11 | 56 | 3921 | — | ○ | ○ | |
| 12 | 64 | 3021 | — | ○ | ○ | |
| 13 | 41 | — | 1.8 | ○ | ○ | |
| 14 | 43 | — | 1.7 | ○ | ○ | |
| 15 | 38 | — | 1.4 | ○ | ○ | |
| 16 | 37 | — | 1.9 | ○ | ○ | |
| 17 | 38 | — | 2.1 | ○ | ○ | |
| 18 | 39 | — | 2.2 | ○ | ○ | |
| Resin | — | — | — | X | X | Comparative Examples |
| Zn-coated Steel sheet | — | — | — | ○ | X | |

Note for Table 2
(1) elongation after fracture
(2) work-hardening coefficient
(3) diffusion of hydrocarbon in a just-fabricated state is not detected (○) or detected (X)
(4) diffusion of hydrocarbon is not detected (○) or detected (X) after 150,000 miles running test Effect of the Invention A stainless steel sheet good of formability and corrosion-resistance is selected as a material for a fuel tank of a motor vehicle according to the present invention as above-mentioned. The stainless steel sheet is press-worked to a product shape without cracks even under severe working conditions, and the fabricated fuel tank keeps its good hermetic structure over a long term free from open holes caused by pitting corrosion. Since its corrosion resistance is derived from stainless steel itself, there is no fear of degradation of corrosion-resistance, e.g. peeling-off or dropping of a plating layer as noted in a fuel tank made from an Al-coated steel sheet. Consequently, the proposed fuel tank is a reliable product without diffusion of gasoline harmful on global environment.

What is claimed is:

1. A fuel tank for a motor vehicle, which is made from an austenitic stainless steel sheet consisting of 0.10 mass % or less of C+N, 1.0 mass % or less of Si, less than 0.005 mass % of S, 1.0 mass % or less of Mn, 15–20 mass % of Cr, 5–19 mass % of Ni, 2.0–5 mass % of Cu, 0–3.0 mass % of Mo, 0–0.5 mass % of Al, 0–1.0 mass % of at least one selected from the group consisting of Ti, Nb, Zr and V, 0–0.1 mass % of B, 0–0.05 mass % of rare earth metals, 0–0.03 mass % of Ca and the balance being Fe except inevitable impurities, the austenitic stainless steel sheet having elongation of 50% or more after fracture by a uniaxial stretching test with a work-hardening coefficient of 4000 N/mm² or less, the austenitic stainless steel sheet being coated with a Cr-enriched passive film with more than 25 atomic % of Cr and less than 75 atomic % of Fe.

2. A fuel tank for a motor vehicle, which is made from a ferritic stainless steel sheet consisting of 0.10 mass % or less of C+N, 2.0 mass % or less of Si, 1.0 mass % or less of Mn, less than 0.01 mass % of S, 11–20 mass % of Cr, 0.60 mass % or less of Ni, 0.50 mass % or less of Cu, 0–3.0 mass % of Mo, 0–0.5 mass % of Al, 0–1.0 mass % of at least one selected from the group consisting of Ti, Nb, Zr and V, 0–0.1 mass % of B, 0–0.05 mass % of rare earth metals, 0–0.03 mass % of Ca and the balance being Fe except inevitable impurities, the ferritic stainless steel sheet having elongation of 30% or more after fracture by a uniaxial stretching test with Lankford value of 1.3 or more, the ferritic stainless steel sheet being coated with a Cr-enriched passive film with more than 25 atomic % of Cr and less than 75 atomic % of Fe.

* * * * *